Aug. 2, 1938.　　　P. E. HARRISON　　　2,125,633
METHOD OF MAKING TIRE CORD
Original Filed Jan. 9, 1937
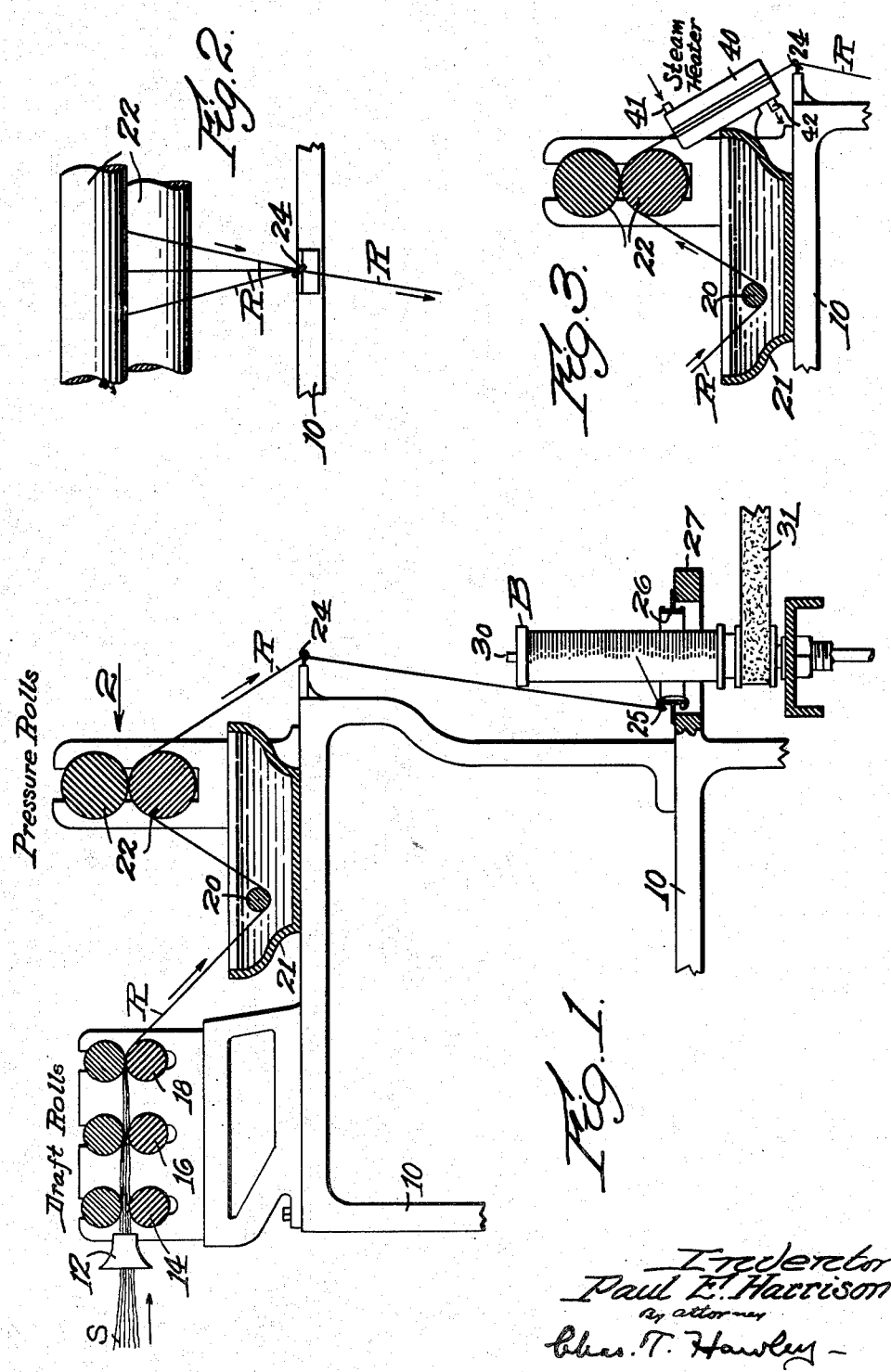

Patented Aug. 2, 1938

2,125,633

UNITED STATES PATENT OFFICE 2,125,633

METHOD OF MAKING TIRE CORD

Paul E. Harrison, Dover, N. H.

Original application January 9, 1937, Serial No. 119,798. Divided and this application October 6, 1937, Serial No. 167,612

6 Claims. (Cl. 117—2)

This invention is a division of my prior application Serial No. 119,798, filed by me January 9, 1937 on Tire cord and method and apparatus for making the same.

This invention relates to the manufacture of twine, cord or cable, and relates more particularly to the production of a type of special cord used in the manufacture of automobile tires. Such cord is commonly made of cotton and is formed by successive doubling or cabling of a considerable number of separately spun threads. In a typical tire cord, five separately spun threads are twisted together to form a strand, and three of these five-thread strands are then twisted or cabled together to form a cord. This cord thus consists of fifteen separately spun threads, assembled by two successive twisting operations in which the twist is usually right-hand in one operation and left-hand in the other.

In the use of automobile tires a very considerable degree of heat is generated, particularly in hot weather when the temperature in the tire carcass may range as high as 220° F. Operation of a tire under such temperature conditions is found to gradually weaken the usual type of tire cord and eventually causes the cords to break down.

It is the general object of my invention as herein defined to provide an improved and simplified method of manufacturing a tire cord having increased strength and substantially improved heat-resisting qualities.

My invention further relates to certain steps in ordered procedure which will be hereinafter described and more particularly pointed out in the appended claims.

Apparatus adapted for manufacturing tire cord by my improved method is shown in the drawing, in which Fig. 1 is a sectional side elevation of a combined drafting, impregnating and spinning apparatus;

Fig. 2 is a partial front elevation thereof, looking in the direction of the arrow 2 in Fig. 1; and Fig. 3 is a partial sectional view showing the addition of a heater to the apparatus shown in Fig. 1.

In the manufacture of my improved cord, I omit entirely all preliminary spinning and cabling operations, and I form the cord direct from rovings as delivered by the usual drawing frame. Such rovings are practically without twist and each roving comprises a continuous strand formed of a multiplicity of substantially parallel untwisted fibers. In the manufacture of tire cord, these fibers are commonly cotton.

I treat each such roving with a liquid which impregnates the parallel untwisted fibers and which causes them to be formed into a cohesive strand. I then preferably combine several of these cohesive strands by a "low-twist" spinning operation, either with or without preliminary heating and drying of the strands.

The cord thus produced substantially exceeds in strength a cord of the same size or weight formed from spun threads by doubling or cabling. I have found by test that a cord of a certain size of my manufacture may have an average breaking strength of twenty-two pounds, as compared with sixteen to eighteen pounds for commercial cords of the same size or weight but of conventional manufacture.

My improved cord is also found by test to be very much less affected by high temperature. In fact, after subjection of my improved cord to a temperature of 250° F. for twenty-four hours, the reduction in breaking strength is less than five percent, whereas with cords of the usual type a reduction as great as twenty-five percent may result from similar treatment.

While my improved method as above described may be carried out in different ways, I have found it desirable to guide the strands direct from the drawing frame into a bath of suitable impregnating liquid, and then to pass the strands between press rolls to remove surplus liquid, after which the strands may be drawn through a heating device by which the strands are wholly or partially dried.

The desired number of strands are then preferably delivered direct to a spinning device, which may consist of a bobbin mounted on a driven spindle and rotating within a spinning ring having a traveler through which the cord is guided to the bobbin.

Only comparatively low twist is required in my improved cord, the twist commonly being less than ten turns per inch, whereas a typical cord of the usual type may comprise as much as seventeen turns right-hand twist in the spun threads, ten additional turns righthand twist in the five-thread strands, and sixteen additional turns left-hand twist in the cord itself.

I not only thus produce a cord of improved qualifications with greater strength and better heat resistance, but I also omit several steps in manufacture, as compared with the usual procedure. In my improved process, the impregnating, drying and assembling of the strands in a low twist cord or cable may be performed as a single continuous operation in direct association with the usual drawing frame. On the other hand, the manufacture of cord by the conventional procedure involves the use of successive roving frames and a spinning frame to produce the spun threads, and further involves two successive twisting operations in successive machines. All of these steps also involve repeated winding of the roving, thread or strands on spools or bobbins, and assembling and arrangement of these spools or bobbins in successive machines.

While I have described my invention with reference to the production of a cord from three strands of cotton fibers, it will be understood that many features of my invention are of general application. Instead of three strands, two, four or more strands may be combined. Instead of cotton fibers, I may use other fibers, either vegetable, animal or synthetic, and the rovings may be produced not only by a drawing frame, but by any other desired method or machine.

Also the impregnating liquid may be widely varied. While excellent results are attained by the use of uncoagulated rubber or latex, many other liquids may be used to advantage, such as modified latex, tannic acid, bicarbonates of alkaline earths, synthetic resins, synthetic waxes, proteins such as casein, cellulose esters, and other impregnating materials which have a protective action on the fibers.

While my improved process is not dependent on a particular apparatus, one convenient form of such apparatus is shown in the drawing in which is shown a frame 10 supporting suitable drafting, impregnating and spinning apparatus.

The drafting mechanism is indicated by a trumpet or guide 12, back rolls 14, intermediate rolls 16 and front rolls 18. The sliver S is introduced through the trumpet 12 and is drafted in the usual manner by the successive drawing rolls, thus delivering a reduced roving R formed of a multiplicity of substantially parallel textile fibers. In the manufacture of tire cord, these fibers are commonly of cotton.

As the roving R leaves the front rolls 18, it passes under a guide roll 20 in a trough or receptacle 21 containing a suitable cohesive impregnating liquid. The impregnated roving is then drawn upward between pressure rolls 22, one of which is preferably rotated in timed relation to the speed of the front rolls 18. No drafting is ordinarily performed by the pressure rolls 22 however, as these rolls act mainly to squeeze out excess liquid from the impregnated roving, which liquid returns by gravity to the receptacle 21, above which the rolls 22 are mounted.

The impregnated roving R is then drawn downward through a guide wire 24 and through a traveler 25 on a spinning ring 26 supported in a ring rail 27 carried by the frame 10. The roving is then wound on a bobbin B mounted on a spindle 30 which is driven by a belt 31. As the bobbin rotates, the traveler 25 is drawn around the ring 26, thus imparting the desired low twist to the roving R as it is drawn downward. Either the ring rail or the spindle is vertically reciprocated in the usual manner.

In the production of my improved cord, particularly when used for tire purposes, I have found that relatively low twist is sufficient. The twist commonly used does not exceed ten turns per inch and in many instances is substantially less.

While I may form a cord from a single sliver S and roving R, if of sufficient size, I prefer to form the cord of a plurality of rovings R, separately delivered by the pressure rolls 22 but drawn through a common guide wire 24. In Fig. 2 I have shown three such rovings combined to form a single-strand cord, but a cord may be formed from two, four, or a larger number of separate rovings.

In Fig. 3 I have indicated the addition of a heater 40 by which the impregnated rovings R may be partially or wholly dried before delivery to the spinning apparatus. This heater may be provided with a steam supply pipe 41 and return pipe 42, or may be heated in any other convenient manner. For certain textile materials and certain impregnating liquids, the use of the heater is desirable, while for other materials and other impregnating liquids the heater is not essential.

While the carrying out of my improved process is not dependent on any particular form of apparatus, the mechanism shown in the drawing is well adapted for carrying out my process as a continuous operation and will produce a uniform cord for use in tires or for other purposes which is, as descibed, of increased strength and superior heat-resistant qualities.

Having thus described my invention and the advantages thereof, I do not wish to be limited to the details herein disclosed, otherwise than as set forth in the claims, but what I claim is:—

1. The method of making a cord of high tensile strength and highly heat-resistant which comprises preparing a substantially untwisted roving having a multiplicity of parallel textile fibres, impregnating said roving while substantially untwisted with a cohesive liquid which is heat-resistant when dried, and spinning said impregnated roving to form a single-strand cord, the impregnating and spinning forming one continuous operation.

2. The method of making a cord of high tensile strength and highly heat-resistant which comprises preparing a substantially untwisted roving having a multiplicity of parallel textile fibres, impregnating said roving while substantially untwisted with a cohesive liquid which is heat-resistant when dried, applying drying heat to said impregnated roving, and spinning said impregnated and heated roving to form a single-strand cord, the impregnating, heating and spinning forming one continuous operation.

3. The method of making a cord of high tensile strength and highly heat-resistant which comprises preparing a substantially untwisted roving having a multiplicity of parallel textile fibres, impregnating said roving while substantially untwisted with a cohesive liquid which is heat-resistant when dried, and spinning said impregnated roving to form a single-strand cord with not substantially more than ten turns of twist per inch, the impregnating and spinning forming one continuous operation.

4. The method of making a cord of high tensile strength and highly heat-resistant which comprises preparing a plurality of substantially untwisted rovings each having a multiplicity of parallel textile fibres, simultaneously impregnating said separate rovings while substantially untwisted with a cohesive liquid which is heat-resistant when dried, assembling said impregnated rovings without twisting, and spinning said assembled, impregnated rovings to form a single-strand cord, the impregnating, assembling and spinning forming one continuous operation.

5. The method of making a cord of high tensile strength and highly heat-resistant which comprises preparing a plurality of substantially untwisted rovings each having a multiplicity of parallel textile fibres, simultaneously impregnating said separate rovings while substantially untwisted with a cohesive liquid which is heat-resistant when dried, assembling said impregnated rovings without twisting, and spinning said assembled, impregnated rovings to form a single-strand cord with not substantially more than ten turns of twist per inch, the impregnating, assembling and spinning forming one continuous operation.

6. The method of making a cord of high tensile strength and highly heat-resistant which comprises preparing a plurality of substantially untwisted rovings each having a multiplicity of parallel textile fibres, simultaneously impregnating said separate rovings while substantially untwisted with a cohesive liquid which is heat-resistant when dried, assembling said impregnated rovings without twisting, applying drying heat to said rovings, and spinning said assembled, impregnated rovings to form a single-strand cord, the impregnating, assembling, heating and spinning forming one continuous operation.

PAUL E. HARRISON.